May 8, 1956
C. B. KRIEGH
2,744,576
PIPE AND TUBING CUTTER
Filed March 19, 1954
2 Sheets-Sheet 1
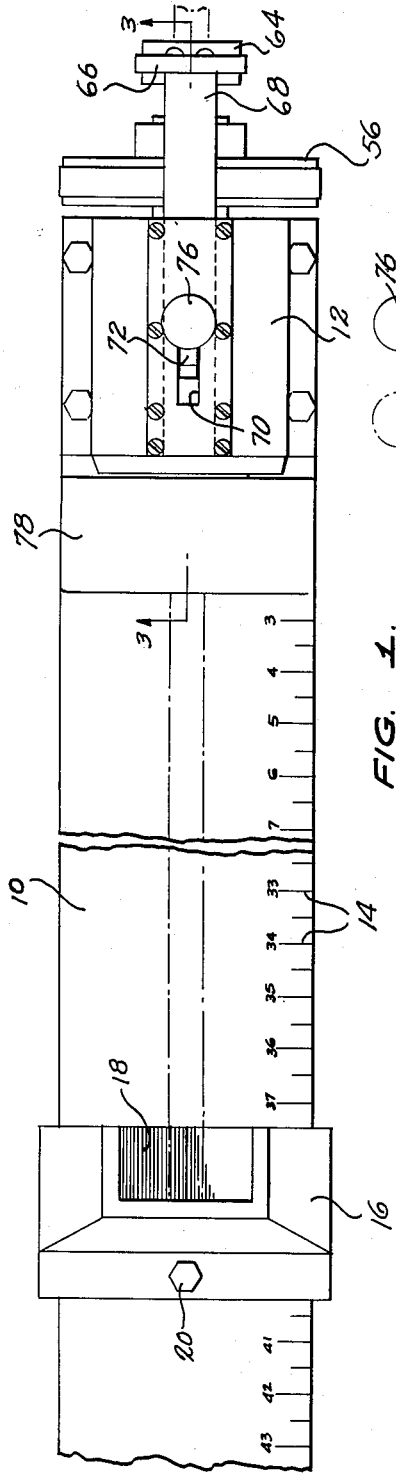
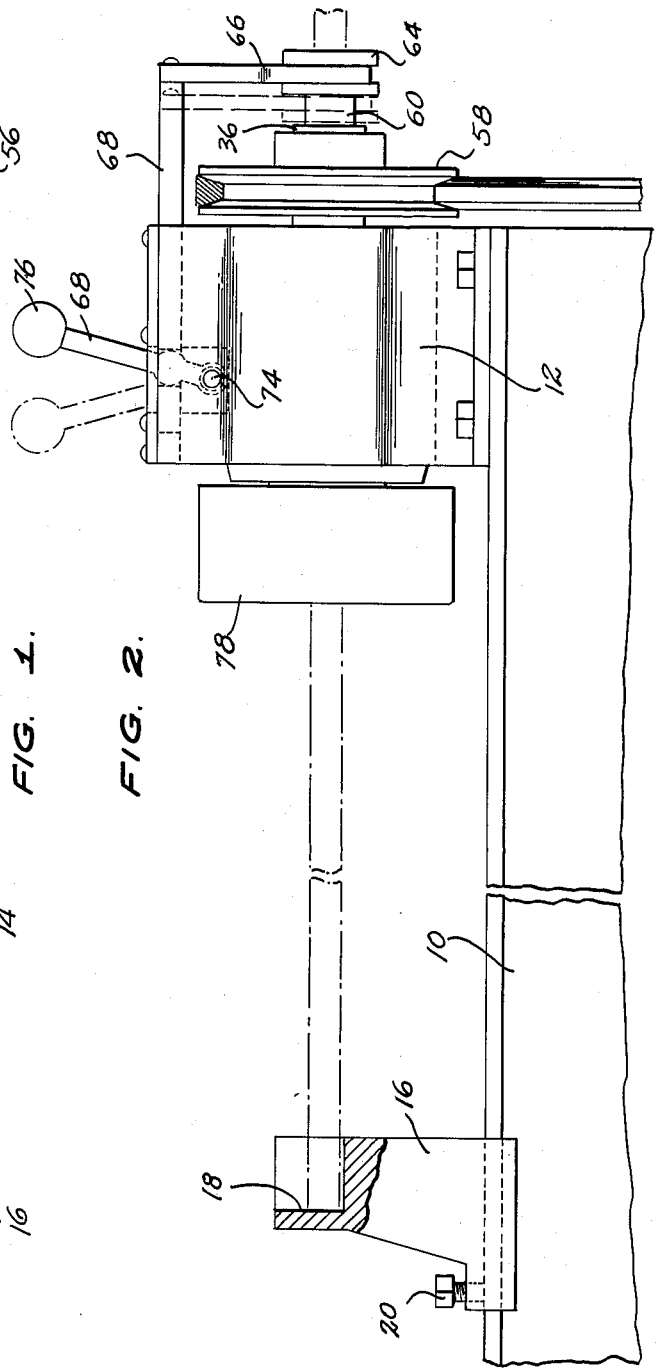
INVENTOR.
CHARLES B. KRIEGH,
BY
McMorrow, Berman + Davidson
ATTORNEYS.

May 8, 1956  C. B. KRIEGH  2,744,576
PIPE AND TUBING CUTTER
Filed March 19, 1954  2 Sheets-Sheet 2
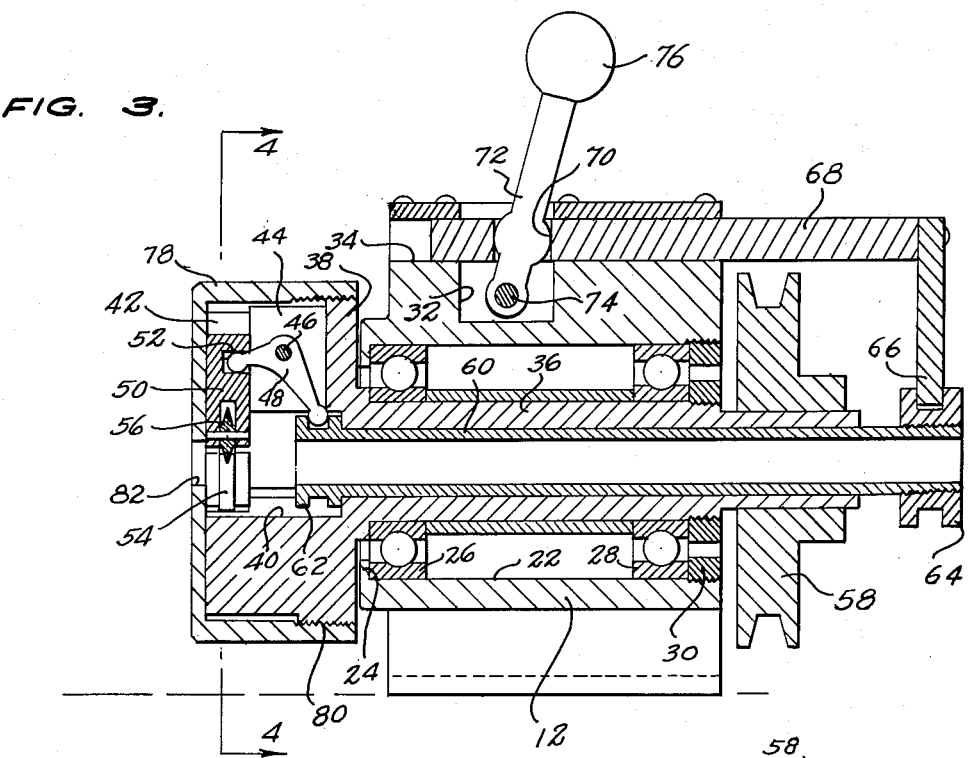
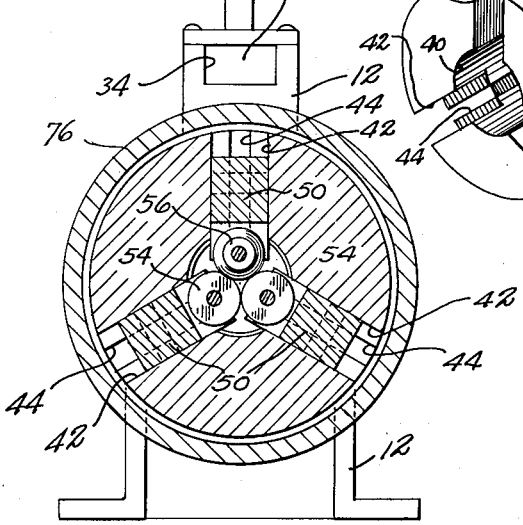
INVENTOR.
CHARLES B. KRIEGH,
BY
McMorrow, Berman & Davidson
ATTORNEYS.

United States Patent Office 2,744,576
Patented May 8, 1956

---

2,744,576

PIPE AND TUBING CUTTER

Charles B. Kriegh, Indianapolis, Ind.

Application March 19, 1954, Serial No. 417,463

1 Claim. (Cl. 164—60)

This invention relates to a pipe and tubing cutter and has for its primary object to sever a length of pipe or tubing into separate lengths.

Another object is to enable a plurality of lengths of pipe to be severed, all of which will be coextensive.

A further object is to positively advance a revolving cutter into contact with the pipe or tubing and simultaneously to advance rollers into contact with the pipe or tubing which tracks the cutter so that any burrs which may be formed in the pipe or tubing as a result of the cutter will be rolled by the rollers so that the cut pipe or tubing will be uniform in diameter throughout its entire length.

The above and other objects may be attained by employing this invention which embodies among its features a cutting tool mounted to revolve about an axis and to move in a path which intersects the axis, means operatively connected to the tool for revolving it about the axis and thereby causing it to move in said path away from the axis under the influence of centrifugal force, a tubular work guide mounted in concentric spaced relation to the axis for movement therealong, said work guide supporting work for movement therethrough along a path which intersects the path of movement of the cutting tool, and means carried by the cutting tool and operatively connected to the work guide for moving the cutting tool in response to longitudinal movement of the work guide and positively advancing said cutting tool against the effort of the centrifugal force into cutting engagement with work supported in the work guide and intersecting the path of movement of the cutting tool.

Other features include rollers mounted adjacent the cutting tool to revolve about the axis and to move in paths which intersect the axis, said rollers being moved outwardly under the influence of centrifugal force and being operatively connected with the sleeve so that they may be positively advanced toward the work acted on by the cutter to roll any burrs formed by the cutter and reduce them to the diameter of the pipe.

Still other features include a bed, a pedestal carried by the bed and extending upwardly therefrom, a tubular spindle mounted in the pedestal to rotate about its longitudinal axis, a head carried by the spindle and extending outwardly therefrom adjacent one end thereof, a cutter mounted in the head to move in a path which intersects the axis and away from the axis under the influence of centrifugal force, a tubular work guide mounted within the spindle for movement longitudinally thereof, means carried by the head and operatively connected to the cutter and to the work guide for causing the cutter to move in response to longitudinal movement of the work guide, and means mounted on the pedestal and operatively connected with the tubular work guide for moving the tubular work guide longitudinally through the spindle and positively advancing the cutter toward work extending through the work guide and into the path of movement of the cutter.

In the drawings:

Figure 1 is a plan view of a pipe and tubing cutter embodying the features of this invention;

Figure 2 is a side view of Figure 1;

Figure 3 is an enlarged fragmentary sectional view taken substantially on the line 3—3 of Figure 1;

Figure 4 is a transverse sectional view taken substantially on the line 4—4 of Figure 3; and Figure 5 is a perspective view of the tubular spindle and the head carried thereby.

Referring to the drawings in detail, a bed 10 carries adjacent one end a pedestal 12 and on its surface longitudinally spaced indices 14 which are adapted to cooperate with a stop 16 having a substantially V-shaped work receiving recess 18 opening through its upper end, which recess also opens through the face of the stop adjacent the pedestal 12. A suitable set screw 20 is carried by the stop 16 for holding the stop in a selected position of adjustment on the bed 10.

Extending through the pedestal 12 is a horizontal bore 22 and carried by the head and extending into the bore adjacent one end thereof is an internally extending annular flange 24 which forms an abutment adjacent one end of the head against which is engaged a conventional antifriction bearing 26. A similar antifriction bearing 28 is mounted in the bore 22 adjacent the end thereof remote from the flange 24 and is held in place by a ring 30 which threadedly engages the pedestal 12. Opening through one side of the pedestal 12 and extending a short distance into the pedestal in perpendicular relation to the bore 22 is a recess 32, and extending longitudinally through the pedestal and communicating with the open side of the recess 32 is a guide groove 34, the purpose of which will hereinafter appear.

Mounted for rotation in the antifriction bearings 26 and 28, and extending through the pedestal 12 is a tubular spindle 36 carrying adjacent one end a head 38 and formed in the head is a bore 40 which opens through the end of the head remote from the spindle 36. Radial grooves 42 are formed in the head 38 and open through the end thereof remote from the spindle 36 to define guideways in which are mounted the carriages to be more fully hereinafter described. The grooves 42 not only open through the end of the head 38 remote from the spindle 36, but also open through the periphery thereof and formed in the head 38 at the bottoms of the grooves 42 are narrower grooves 44 in which are mounted for rocking movement about pivots 46 which extend transversely through the grooves 44 bell cranks 48, one end of each of which extends into an adjacent groove 42, while the opposite end projects into the bore 40, as will be readily understood upon reference to Figure 3.

Mounted for movement in each guideway 42 is a carriage 50 having a notch 52 therein for receiving the adjacent leg of its respective bell crank 48 and carried by two of the carriages 50 are rollers 54, while a conventional cutter 56 of the rotary type is carried by another of the carriages 50. The rollers 54 and cutter 56 project beyond the ends of the carriages 50 adjacent the longitudinal axis of the spindle 36 and as the spindle rotates, the carriages 50, the rollers 54 and cutter 56 will move outwardly under the influence of centrifugal force away from the axis along radial paths. Mounted on the end of the spindle 36 remote from the head 38 is a drive pulley 58 by means of which the spindle may be rotated in its bearings.

Mounted for longitudinal sliding movement through the spindle 36 is a tubular work holder and guide 60 which extends into the bore 40 and carries an annularly grooved head 62 in the groove of which are received the ends of the bell cranks 48 remote from those received in the notches 52. It will thus be seen that by shifting the tubular work holder and guide 60 longitudinally within the tubular spindle 36, the carriages 50 may be moved in their paths toward or away from the axis of the spindle. As will be readily understood upon reference to Figure 3, the tubular work support and guide 60 extends beyond the end of the spindle 36 remote from the head 38 and carries a grooved collar 64 in which is received the legs of a fork 66 which is carried by a slide 68 which is mounted in the groove 34 for longitudinal sliding movement therein. Formed in the slide 68 intermediate the ends thereof is an opening 70 through which extends a hand lever 72 which is pivotally supported as at 74 within the recess 32 and carries adjacent its outer end a knob 76 by means of which the lever 72 may be moved about its pivot 74 to shift the slide 68 and through the medium of the fork 66 cause the tubular work guide to move longitudinally through the spindle 36.

In the preferred form of the invention, a suitable cap 78 is threadedly engaged as at 80 with the head 38 and is provided with an opening 82 which aligns axially with the spindle 36 and tubular work guide 60 to enable work supported in the tubular work guide 58 to be extended through the cap and into engagement with the stop 16. Work in this position will intersect the paths of movement of the carriages 50 so that upon moving the work guide 60 longitudinally in one direction through the spindle 36, the cutter 56 and rollers 54 may be positively advanced into contact with the work. Obviously, by setting the stop 16 at a selected distance from the pedestal 12, according to the indices 14 carried by the bed 10, the length of the piece of work being cut may be readily selected.

By reference to Figures 3 and 4, it will be seen that the construction is one which permits ready assembly and disassembly of the cap, cutter means comprising carriages 50 and rotary blade and rollers 56, 54, bell cranks 48, and the head 38. In other words, the cap, of cylindrical formation, having internal threads engaging external threads on the correspondingly shaped head, can be removed by unthreading the same from the head. When the cap is removed, the carriages are fully exposed within the radial guideways 42. The guideways are so proportioned as to permit removal of the carriages 50 by straight line movement thereof to the left in Figure 3, along a line paralleling the axis of rotation of the spindle. In other words, the guideways are of constant width over their full depth and are fully open at the outer end of the head. Further, the notches 52 are so proportioned, relative to the ends of the bell cranks that engage therein, as not to inhibit in any way the free movement of the carriages 50 along said straight lines. Thus, assuming that a cutter blade has become worn, to replace the same it is merely necessary that the cap be removed after which the carriage carrying the cutter blade or blades is simply grasped and pulled straight outwardly along said straight lines paralleling the spindle axis. Since the end of the bell crank simply seats in the notch 52, and since the guideway is so proportioned as not to restrain the carriage against said straight line movement, the substitution of a new blade for a worn blade is swiftly effected, and the cap replaced to again hold the carriages assembled with their associated bell cranks and with the head. This provides for minimum "down" time on the machine, that is, the machine is out of operation for very little time during the replacement of cutters. All this results from the arrangement wherein the carriages are, in effect, free to "fall out" so to speak, from the guideways when the cap is removed, with their removal and the insertion of new carriages being effected without the use of special tools, etc.

In use, it is quite obvious that work is thrust through the tubular work guide 60 and with the head 38 in motion about its longitudinal axis, the carriages 50 through centrifugal effort will be thrown outwardly in their respective guide grooves 42 so that the work may be thrust completely through the head and into engagement with the stop 16. By moving the handle 76 in a clockwise direction as viewed in Figure 3, the work guide 58 will be moved in a direction to cause the carriages 50 to advance toward the axis of the spindle 36 and consequently move the rollers 54 and cutter 56 into engagement with the work which intersects the paths of movement of the rollers and cutter. During such periods as the cutter and rollers are not under the influence of the handle 76, they will be held by centrifugal force outwardly and away from the axis to permit work to be advanced through the work guide into engagement with the stop so as to intersect the paths of movement of the cutter and rollers.

Referring to Figure 3, it will be observed that the cap 78 is removable, by unthreading of the same from the head. As a result, when the cap is removed, the several carriages 50 are fully exposed, and can be lifted out of the guideways 42, since the guideways are formed open at the sides thereof remote from the bell cranks 48.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A tube cutter comprising a pedestal having a bore; a tubular spindle rotatably mounted in the bore and projecting at both ends out of the bore; means connected to one of the projecting ends for driving the spindle; a cylindrically shaped, externally threaded head rigid at one end with the other projecting end of the spindle and having an axial work receiving recess communicating at one end with the bore and opening at its other end upon the other end of the head, the head having at least one guideway opening at one end into and extending radially of the recess at said other end of the recess, said guideway opening along one side upon said other end of the head; cutter means slidable radially of the recess in the guideway, said cutter means including a carriage removably engaged in the guideway and a blade connected to the carriage; a tubular work receiving guide mounted in the bore to slide axially of the bore and projecting at one end out of said one end of the spindle and at its other end into said one end of the recess; means carried by the pedestal connected with said one end of the guide for shifting the same axially of the spindle; means connected between the other end of the guide and the cutter means for translating axial movement of the guide into movement of the cutter means radially of the recess, comprising a bell crank pivoted in the head and having one end extending into the guideway, the carriage having a rearwardly opening notch into which said end of the bell crank extends; a cap enclosing the head, said cap including an end wall closing the open side of the guideway and formed with a work receiving opening coaxial with the recess and guide and communicating with said other end of the recess, the cap further including a cylindrical side wall surrounding the head and having internal threads engaging those of the head, said cap when removed from the head freeing the carriage and blade for withdrawal from the guideway, said carriage, the guideway, said end of the bell crank, and the notch being proportioned to permit said withdrawal by straight line movement of the carriage away from the bell crank in a line paralleling the axis of the spindle; and a work rest spaced from the pedestal to support a work piece extending through said opening, said rest having an abutment providing a stop for said work piece.

References Cited in the file of this patent

UNITED STATES PATENTS

| Number | Name | Date |
|---|---|---|
| 661,631 | Bayley | Nov. 13, 1900 |
| 849,147 | Lewis | Apr. 2, 1907 |
| 1,166,456 | Hamer | Jan. 4, 1916 |
| 1,188,807 | Miller | June 27, 1916 |
| 1,669,911 | Oster et al. | May 15, 1928 |
| 1,699,358 | Hay | Jan. 15, 1929 |
| 1,765,208 | Cunningham | June 17, 1930 |
| 2,392,363 | Cafagno | Jan. 8, 1946 |
| 2,443,526 | Williamson | June 15, 1948 |
| 2,446,146 | Tucker | July 27, 1948 |
| 2,521,003 | Gitter | Sept. 5, 1950 |